United States Patent [19]
Melocik et al.

[11] Patent Number: 4,722,410
[45] Date of Patent: Feb. 2, 1988

[54] OBSTACLE DETECTION APPARATUS

[75] Inventors: Grant C. Melocik, Chardon; Joseph J. Harding, Mentor, both of Ohio

[73] Assignee: Caterpillar Industrial Inc., Mentor, Ohio

[21] Appl. No.: 878,902

[22] Filed: Jun. 26, 1986

[51] Int. Cl.⁴ .............................................. B60T 7/12
[52] U.S. Cl. .................... 180/169; 180/275; 303/20
[58] Field of Search ............ 180/167, 169, 275; 188/171; 303/20, 92

[56] References Cited

U.S. PATENT DOCUMENTS

| 3,560,922 | 2/1971 | Wilson | 340/61 |
| 3,664,701 | 5/1972 | Kondur | 293/4 |
| 4,087,782 | 5/1978 | Oishi et al. | 340/52 |
| 4,280,580 | 7/1981 | Wojcik | 180/169 |
| 4,363,376 | 12/1982 | Sjoberg et al. | 180/275 |
| 4,425,622 | 1/1984 | Arikawa | 303/92 X |
| 4,499,543 | 2/1985 | Matsuda | 303/92 X |

FOREIGN PATENT DOCUMENTS

PCT2539 11/1980 PCT Int'l Appl. .

Primary Examiner—John J. Love
Assistant Examiner—Michael Mar
Attorney, Agent, or Firm—Stephen L. Noe

[57] ABSTRACT

Collision detection systems are commonly provided on automatic guided industrial vehicles. Such systems should be as reliable as possible and can advantageously utilize a fault detection apparatus. The subject apparatus provides a plurality of radiant energy emitting devices and receiving devices positioned along a vehicle at locations sufficient that an obstacle in a respective path of the vehicle interrupts the reception of radiant energy by respective ones of the receiving devices. Interruptable devices controllably connect a power supply to a brake control circuit in response to continuous reception of radiant energy by the respective receiving devices, and disconnect the power supply from the brake control circuit in response to any of the receiving devices failing to continue to receive radiant energy from the respective emitting device. A vehicle control circuit controllably produces first and second energization signals in response to a predetermined condition of the vehicle, and first and second switches receive respective ones of the first and second energization signals and responsively controllably supply electrical power from the power supply to predetermined ones of the emitting devices and the receiving devices.

3 Claims, 4 Drawing Figures

OBSTACLE DETECTION APPARATUS

TECHNICAL FIELD

This invention relates generally to an apparatus for detecting obstacles in the path of a vehicle, and more particularly, to an apparatus for detecting failure of an element associated with an obstacle detection device.

BACKGROUND ART

Automatic guided vehicles operating without the assistance of a human operator are in common commercial use today. Such vehicles require sophisticated collision detecting devices to prevent contact between the vehicle and objects in the area surrounding the vehicle. Obstacle detection systems of various designs have been employed in the past. Systems utilizing the transmission and reception of radiant energy have proven particularly suitable for this task. For example, U.S. Pat. No. 3,664,701 issued May 23, 1972 to Lewis Kondur is typical of one such system. The Kondur device includes a light source mounted on the vehicle directed toward a retroreflective target mounted on a movable bumper associated with the vehicle. Under normal circumstances, energy from the light source is directed back along the identical path from the target to a light receiving device. In response to contact between the movable bumper and an external object, the retroreflector is moved relative to the light source and the energy is no longer detected by the receiving device.

Bumper systems such as that described above are adequate for detecting certain classes of obstacles. However, such systems fail to detect objects encroaching from the sides or rear of a vehicle. In addition, owing to the high degree of reliability required for obstacle detection systems, it is desirable to employ some form of failure protection apparatus in association with the obstacle detection system.

Some initial attempts to provide such failure protection devices are known in the art. For example, U.S. Pat. No. 3,560,922 issued Feb. 2, 1971 to U.S. Pat. No. 3,560,922 issrured Feb. 2, 1971 to Kenneth A. Wilson incorporates a simple contact switch type bumper system. In response to contact between a bumper and an external object, a switch contact is closed, producing a stop signal. The stop signal is also produced in response to failure of one of the wire connections to the bumper switch. Another example of a failure detection system is found in U.S. Pat. No. 4,087,782 issued May 2, 1978 to Kazuo Oishi, et al. A collision detecting system has a bumper inductively coupled to an oscillator circuit. A "checking" switch is employed to selectively operate the detection system in a "check" mode. While in the "check" mode, a warning is provided in response to detecting an open circuit in the lead wires of a sensor and to detecting failure of the oscillator circuit.

None of the prior systems known in the art adequately detects failures associated with an optical collision detection device. Such a failure protection device should advantageously detect both open and short circuit conditions associated with the collision detection system, and should responsively produce a signal indicating such failure. It is further desirable that the failure detection system operate automatically upon each start up of the vehicle.

The present invention is directed to overcoming one or more of the problems as set forth above.

DISCLOSURE OF THE INVENTION

In one aspect of the present invention, an apparatus for sensing an obstacle in the path of a vehicle is provided. The vehicle has a power supply, a vehicle control circuit, and a vehicle brake and brake control circuit. A plurality of radiant energy receiving devices are optically responsive to respective radiant energy emitting devices. Each optically responsive set of emitting and receiving devices is positioned along the vehicle at a location sufficient to cause an obstacle in a respective path of the vehicle to interrupt the reception of radiant energy by the respective radiant energy receiving device. First and second interruptable devices controllably connect the power supply to the brake control circuit in response to each of the radiant energy receiving devices continuing to receive radiant energy from the respective radiant energy emitting device, and disconnect the power supply from the brake control circuit in response to any of the receiving devices failing to continue to receive the radiant energy from the respective emitting device.

In a second aspect of the present invention, an apparatus for detecting failure of the obstacle sensing device associated with a vehicle is provided. The optical sensing device has a plurality of radiant energy emitting devices, each associated with a respective radiant energy receiving device, and the vehicle has a power supply and a vehicle brake and brake control circuit. The vehicle control unit controllably produces first and second energization signals in response to a predetermined condition of the vehicle. First and second switches receive respective ones of the first and second energization signals, and responsively controllably supply electrical power from the power supply to predetermined ones of the radiant energy emitting and receiving devices. First and second solenoid coils are each serially connected to respective first and second sets of receiving devices. First and second electrical contact sets are serially connected between the power supply and the brake control circuit, each of the first and second electrical contact sets being responsive to a respective one of the first and second solenoid coils.

The present invention provides a obstacle detection apparatus that utilizes optical elements for detecting the presence of an obstacle. The obstacle detection device is advantageously associated with a fault detection circuit sufficient to produce a fault signal in response to detecting various undesirable conditions of the obstacle detection system. The fault detection circuit operates in response to a predetermined condition of the vehicle.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
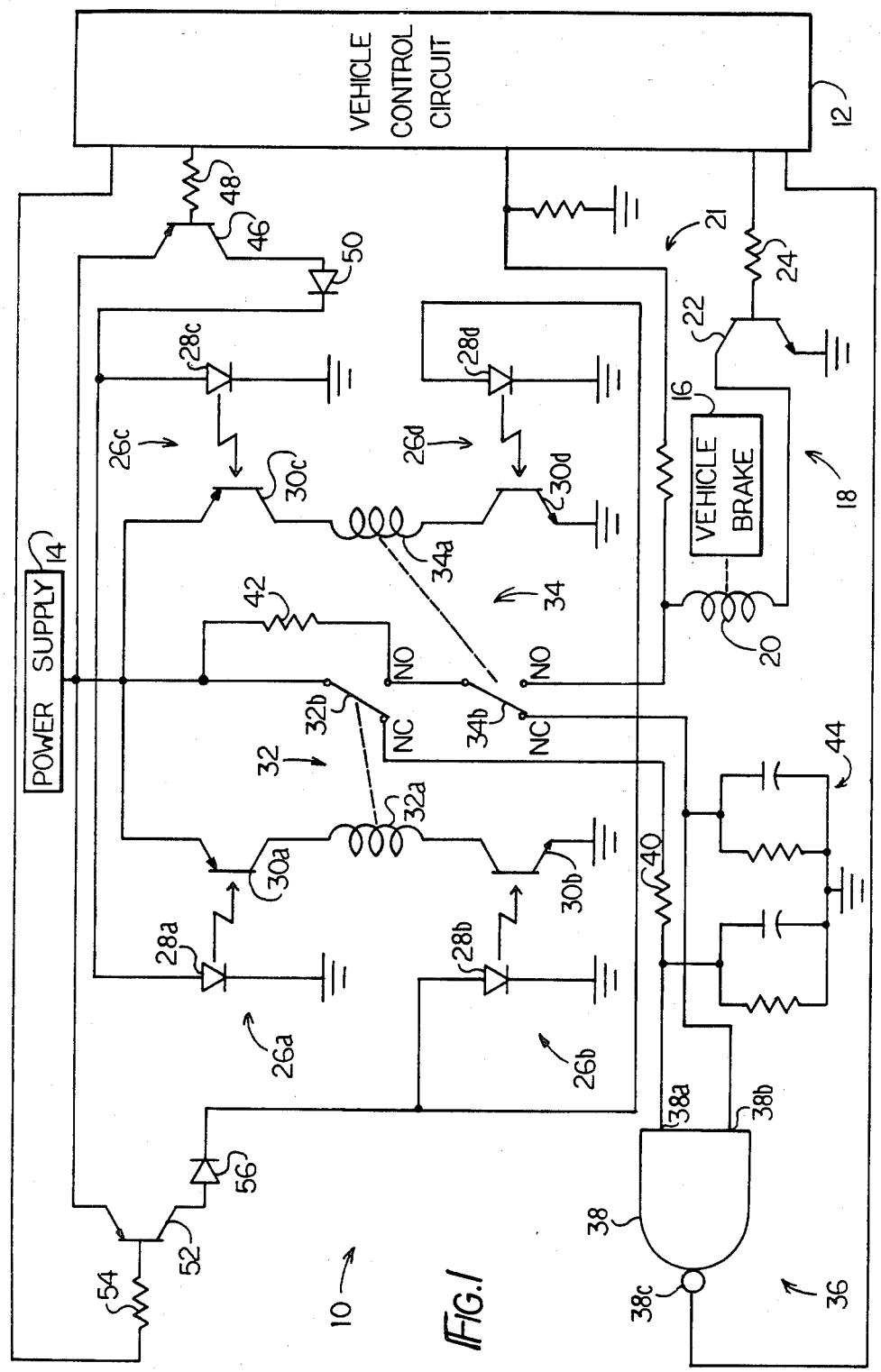
FIG. 1 is a schematic diagram of an apparatus incorporating one embodiment of the present invention.

Referring to the FIGS., an apparatus employing certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

A vehicle control circuit 12 is associated with the apparatus 10. The vehicle control circuit 12 is, for example, a microprocessor or other logic control unit associated with a vehicle 13. The vehicle control circuit 12 is capable of producing and receiving electrical signals as is known in the art.

A power supply 14, and vehicle brake 16 and brake control circuit 18 are also associated with the vehicle 13. The vehicle brake 16 is, for example, an electrical brake having an associated brake excitation coil 20. The coil 20 is controllably connected to the power supply 14, and is connected through a voltage divider 21 to the vehicle control circuit 12. In response to at least a predetermined magnitude of current flowing through the coil 20, the vehicle brake 16 is disengaged. In response to less than the predetermined magnitude of current flowing through the coil 20, a spring system (not shown) causes the vehicle brake 16 to engage, stopping the vehicle, as is well-known in the art. Assuming that power is provided to the coil 20, the magnitude of current flowing through the coil is controlled by a transistor switch 22 in response to pulses received from the vehicle control circuit 12 through a resistor 24.

A plurality of sets 26a-d of radiant energy emitting devices 28a-d and radiant energy receiving devices 30a-d are associated with the apparatus 10. Each radiant energy receiving device 30a-d is optically responsive to a predetermined respective one of the radiant energy emitting devices 28a-d and is positioned along the vehicle at a location sufficient that an obstacle in a respective path of the vehicle interrupts reception of the radiant energy by the respective responsive radiant energy receiving device 30a-d. In the preferred embodiment, the radiant energy emitting devices 28a-d are infrared light emitting diodes, and the radiant energy receiving devices 30a-d are infrared responsive phototransistors.

First and second interruptable devices 32,34 controllably connect the power supply 14 to the brake control circuit 18 in response to each of the radiant energy receiving devices 30a-d continuing to receive the radiant energy from the respective radiant energy emitting device 28a-d, and disconnect the power supply 14 from the brake control circuit 18 in response to any of the radiant energy receiving devices 30a-d failing to continue to receive the radiant energy from the respective radiant energy emitting device 28a-d. The first interruptable means 32 includes a first solenoid coil 32a serially connected with a first set 30a, 30b of the plurality of radiant energy receiving devices 30a-d. The second interruptable means 34 includes a second solenoid coil 34a serially connected with a second set 30c, 30d of the plurality of radiant energy receiving devices 30a-d. The first and second interruptable means 32,34 also include respective first and second electrical contact sets 32b, 34b serially connected between the power supply 14 and the brake control circuit 18. Each of the first and second electrical contact sets 32b, 34b is responsive to a respective one of the first and second solenoid coils 32a, 34a.

A logic means 36 controllably produces a fault signal in response to failure of at least one of the radiant energy emitting devices 28a-d the radiant energy receiving devices 30a-d, the first and second solenoid coils 32a, 34a, and the first and second electrical contacts 32b, 34b. The logic means 36 includes a logic gate 38 having a first input terminal a connected to one of the first and second electrical contact sets 32b, 34b, a second input terminal 38b connected to the other of the first and second electrical contact sets 32b, 34b, and an output terminal 38c connected to the vehicle control circuit 12. First and second resistors 40,42 are serially connected between the first and second input terminals 38a, 38b and the power supply 14. Each of the input terminals 38a, 38b is also connected through a filter circuit 44 to circuit ground.

A first transistor switch 46 is connected through a resistor 48 to the vehicle control circuit 12. The transistor switch 46 supplies electrical power from the power supply 14 through a steering diode 50 to the optical emitting devices 28a, 28c. A second transistor switch 52 is likewise connected through a resistor 54 to the vehicle control circuit 12, and supplies electrical power from the power supply 14 through a steering diode 56 to the optical emitting devices 28b, 28d. The optical receiving devices 30a-d are connected directly to the power supply 14.

Industrial Applicability

Figure 2:
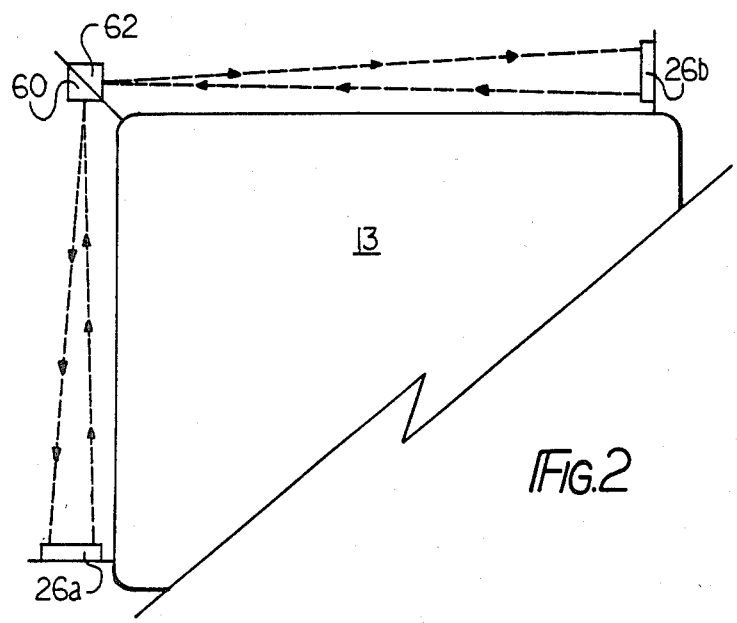
FIG. 2 is a partial top plan view of a vehicle incorporating one embodiment of the present invention.

Operation of the apparatus 10 is best described in relation to its use on a vehicle 13, for example, an automatic guided industrial lift truck. Referring to FIG. 2, a fragmented top view of a vehicle is shown to include first and second sets 26a, 26b of radiant energy emitting and receiving devices. First and second retroreflectors 60,62 are associated with respective ones of the sets 26a, 26b of emitting and receiving devices. The sets 26a, 26b and retroreflectors 60,62 are arranged such that radiant energy is delivered from each of the emitting devices along a respective side of the vehicle 13 and is reflected back to the receiving device by the respective retroreflectors 60,62. Therefore, intrusion of any object into the path of the radiant energy causes the respective receiving device to no longer receive the reflected signal.

Figure 3:
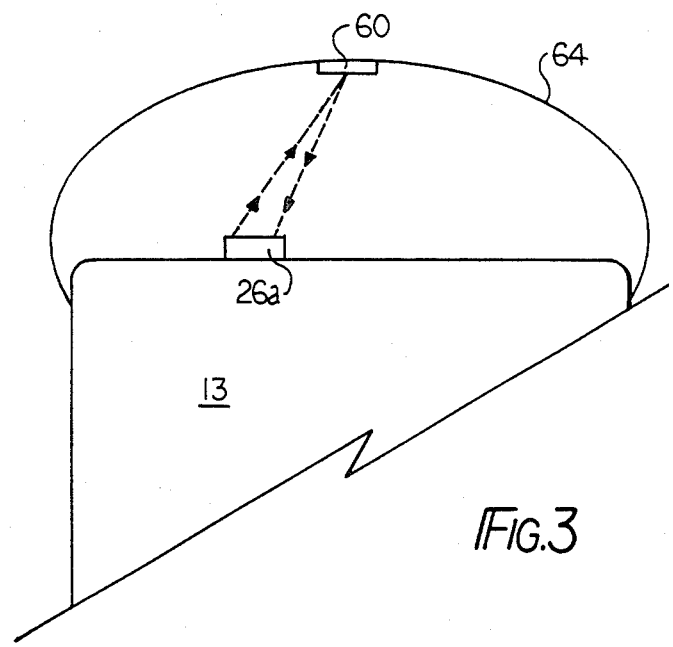
FIG. 3 is a partial top plan view of a vehicle incorporating a second embodiment of the present invention.

FIG. 3 demonstrates an alternative embodiment of the apparatus 10, wherein an emitting and receiving device set 26a is positioned along a portion of the vehicle 13, and the respective retroreflector 60 is positioned on a movable portion of a bumper 64. In response to contact between the bumper 64 and an external object, the retroreflector 60 is moved out of position relative to the set 26a of emitting and receiving devices, and the path of reflected radiant energy is interrupted. In either of the embodiments of FIGS. 2 and 3, additional sets 26a-d of emitting and receiving devices and corresponding retroreflectors, as shown in FIG. 1, are provided in a similar manner to permit detection of obstacles along each of four sides of the vehicle 13, and are not shown in order to simplify the diagrams.

Adverting now to FIG. 1, assume that the vehicle 13 is operating normally. The first and second energization signals are produced by the vehicle control circuit 12 and delivered through the resistors 48,54 to the respective transistor switches 46,52. Responsively, power is delivered from the power supply 14 through the transistor switches 46,52 to each of the emitting devices 28a–d. Assuming that no obstacle is blocking radiant energy from any of the respective receiving devices 30a–d, power flows through the energy receiving devices 30a, 30c, the solenoid coils 32a, 34a, and the receiving devices 30b, 30d to circuit ground.

In response to energization of the solenoid coils 32a, 34a, the respective electrical contact sets 32b, 34b are moved to the normally open position, and electrical power is delivered from the power supply 14 through each of the serially connected electrical contact sets 32b, 34b to the brake control circuit 18. In response to the vehicle control circuit 12 delivering pulses through the resistor 24 to the transistor 22, current is delivered through the brake solenoid coil 20, disengaging the vehicle brake 16. Therefore, in response to normal operating conditions, the vehicle brake 16 is disengaged and the vehicle 13 is controllably operable according to various speed and direction parameters delivered from the vehicle control circuit 12, as is known in the art.

In response to interruption of the radiant energy delivered from any one of the emitting devices 28a–d to the respective receiving device 30a–d, at least one of the receiving devices 30a–d is biased "off", and current flow through the associated solenoid coil 32a, 34a ceases. Responsively, the associated electrical contact set 32b, 34b is moved to the normally closed position and current flow from the power supply 14 to the brake control circuit 18 ceases. Since the brake solenoid coil 20 is no longer connected to the power supply 14, the vehicle brake 16 is spring applied to stop the vehicle 13. The presence or absence of the connection from the power supply 14 to the brake control circuit 18 is detected through the voltage divider 58 by the vehicle control circuit 12. This information can be advantageously used to determine the status of the electrical contact sets 32b, 34b during operation of the vehicle 13.

In response to any one of the radiant energy emitting devices 28a–d, the radiant energy receiving devices 30a–d, and the solenoid coils 32a, 34a failing in an open circuit mode, or to interruption of any of the connecting wires between the various devices and the vehicle control circuit 12, at least one of the electrical contact sets 32b–34b reverts to the normally closed position. Therefore, failure protection for open circuits is automatically assured by the structure of the apparatus 10.

Figure 4:
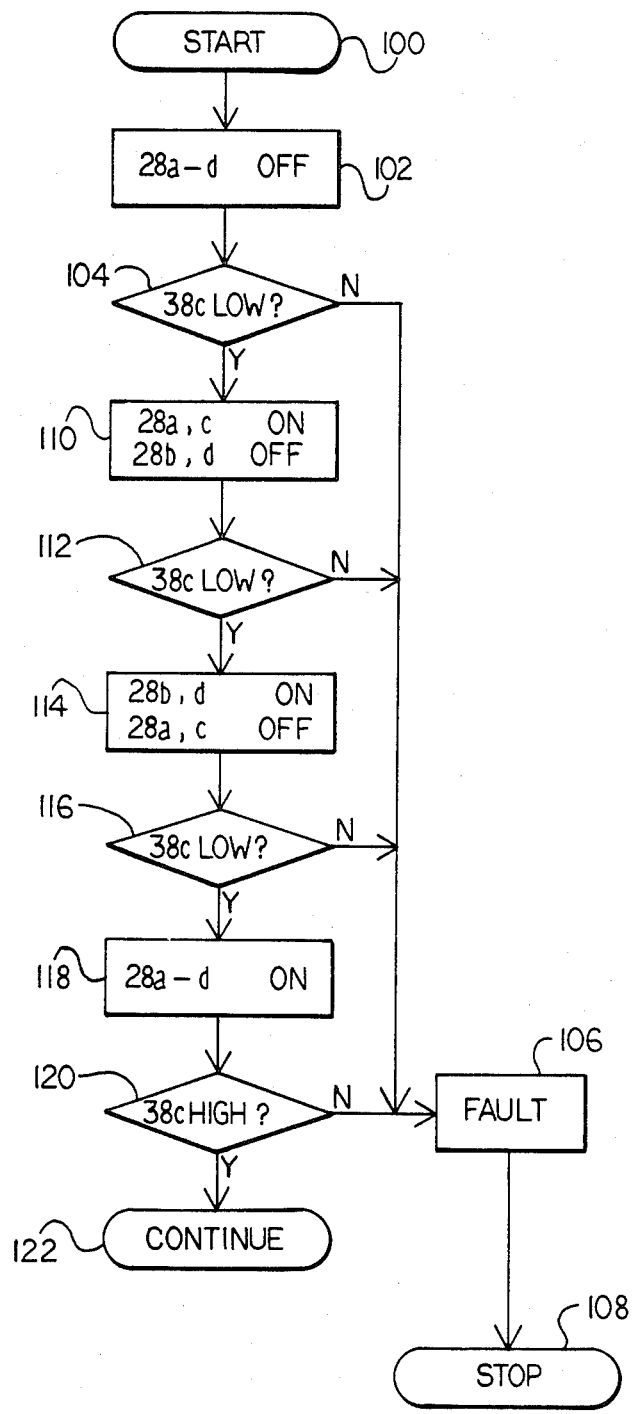
FIG. 4 is a flowchart of a software program module used in one embodiment of the present invention.

Failure of one of the radiant energy receiving devices 30a–d in a short circuit mode, or failure of one of the electrical contact devices 32b, 34b to revert to the normally closed position upon being deenergized, is detected automatically upon each start up cycle of the vehicle. The software module set forth in FIG. 4 is one example of a computer program flowchart sufficient to implement such automatic detection. From this flowchart, a programmer of ordinary skill can produce a set of computer instructions usable in conjunction with the vehicle control circuit 12. Although a properly programmed computer in accordance with the flowchart of FIG. 4 is considered the best mode for performing the automatic fault detection, those skilled in the art will recognize that other computer programs, and hard logic circuits not incorporating a computer, can be readily substituted in the vehicle control circuit 12.

Referring now to the schematic of FIG. 1 and the flowchart of FIG. 4, assume that the vehicle 13 is stopped. Entering the flowchart at the "START" block 100, the radiant energy emitting devices 28a–d are turned "off" in block 102 by the application of appropriate energization signals to the first and second transistor switches 46,52. Responsively, each of the electrical contact sets 32b, 34b is in the normally closed position, and the vehicle brake 16 is spring engaged. The power supply 14 is connected through the first electrical contact set 32b and the resistor 40 to the logic gate first input terminal 38a. Likewise, the power supply 14 is connected through the resistor 42 and the electrical contact set 34b to the logic gate second input terminal 38b. Responsively, the logic gate 38 produces a logic "low" signal at the output terminal 38c which, in turn, is delivered to the vehicle control circuit 12. This signal is examined in the block 104. If the logic "low" signal is not produced, program control progresses to the block 106 where a fault signal is produced, and onto the block 108 where the vehicle 13 is stopped and/or other appropriate action is taken.

Assuming that the logic "low" signal is sensed in the block 104, control passes to the block 110 where the first energization signal is delivered from the vehicle control circuit 12 to energize the first transistor switch 46 while leaving the second transistor switch 52 de-energized. Responsively, power is supplied to the radiant energy emitting devices 28a, 28c but not to the emitting devices 28b, 28d. Assuming that neither of the radiant energy receiving devices 30b, 30d has failed in a short circuit mode, the serially connected solenoid coils 32a, 34a remain de-energized and no change occurs in the logic "low" signal delivered at the output lerminal 38c of the logic gate 38. This is determined in the block 112 where the continued presence of the logic "low" signal causes program control to progress to the block 114. Should a failure have occurred at this point, the logic "low" signal will not be present at the block 112 and program control will instead proceed as above to the block 106.

In the block 114, the state of the first and second energization signals delivered from the vehicle control circuit 12 is reversed, de-energizing the first transistor switch 46 and energizing the second transistor switch 52. Responsively, power is delivered to the radiant energy emitting devices 28b, 28d but not to the radiant energy emitting devices 28a, 28c. Assuming that no short circuit conditions exist in the receiving devices 30b, 30d associated with the energized emitting devices 28b, 28d, neither of the solenoid coils 32a, 34a is energized and the logic signal delivered from the logic gate 38 remains at a logic "low" state. The continued presence of the logic "low" signal is sensed in the block 116 and causes program control to progress to the block 118. Failure to continue to receive the logic "low" signal at the block 116 instead causes program control to proceed to the block 106, as described above.

In each of the above situations, an electrical contact set 32b, 34b that has failed by remaining in the normally open position when the associated solenoid coil 32a, 34a is de-energized, causes the logic gate 38 to produce a logic "high" signal at the output terminal 38c. Responsively, the presence of the logic "high" signal (or absence of the logic "low" signal) is detected in one of the blocks 112,116 as described above, and the fault signal is produced at the block 106.

Assuming that no faults are detected up to this point, each of the radiant energy emitting devices 28a–d is turned "on" by application of the first and second energization signals in the block 118. Responsively, each of the solenoid coils 32a, 34a is energized and the associated electrical contact sets 32b, 34b are switched to the normally open position. The logic gate 38 therefore produces a logic "high" signal at the output terminal 38c. The signal is received by the vehicle control circuit 12 and sensed at the block 120. Assuming that the logic "high" signal is received, program control passes to the block 22 wherein normal operation of the vehicle 13 commences. Should the logic "high" signal not be received at the block 120, program control instead progresses to the block 106 where the fault signal is produced.

The apparatus 10 provides collision detection for obstacles entering the path of the vehicle 13 from any direction. Both open circuit and short circuit fault conditions are automatically detected.

Other aspects, objects, advantages and uses of this invention can be obtained from a study of the drawings, the disclosure, and the appended claims.

We claim:

1. Apparatus for detecting failure of an obstacle sensing device associated with a vehicle, said vehicle having a power supply and a vehicle brake and brake control circuit, comprising:
   a plurality of radiant energy emitting devices each associated with a respective radiant energy receiving device;
   a vehicle control means for controllably producing first and second energization signals in response to a predetermined condition of said vehicle;
   first and second switch means for receiving respective ones of said first and second energization signals, and responsively controllably supplying electrical power from said power supply to predetermined ones of said radiant energy emitting and receiving devices;
   first and second solenoid coils each serially connected to respective first and second sets of radiant energy receiving devices, said first and second sets of radiant energy receiving devices being mutually exclusive;
   first and second electrical contact sets serially connected between said power supply and said brake control circuit, each of said first and second electrical contact sets being responsive to a respective one of said first and second solenoid coils; and
   logic mean for controllably producing a fault signal in response to failure of at least one of said radiant energy emitting devices, said radiant energy receiving devices, said first and second solenoid coils, and said first and secnd electrical contact sets.

2. Apparatus for sensing an obstacle in the path of a vehicle, said vehicle having a power supply, a vehicle control circuit, and a vehicle brake and brake control circuit, comprising:
   a plurality of radiant energy emitting means for controllably producing radiant energy;
   a plurality of radiant enerty receiving means for receiving said radiant energy, each of said radiant energy receiving means being optically responsive to a predetermined one of said radiant energy emitting means, and wherein eahc optically responsive set of said radiant energy emitting means and a radiant energy receiving means is positioned along said vehicle at a location sufficient that an obstacle in a respective path of said vehicle interrupts the reception of said radiant energy by said respective responsive radiant energy receiving means;
   first and second interruptible means for controllably connecting said power supply to said brake control circuit in response to each of said radiant energy receiving means continuing to receive sasid radiant energy from said respective radiant energy emitting means and disconnecting said power supply from said brake control circuit in response to any of said radiant energy receiving means failing to continue to receive said radiant energy from said respective radiant energy emitting means, wherein said first interruptible means includes a first solenoid coil serially connected with a first set of said plurality of radiant energy receiving means and a first electrical contact set serially connected between said power supply and said brake control circuit, and said second interruptible means includes a second solenoid coil serially connected with a second set of said plurality of radiant energy receiving means and a second electrical contact set serially connected between said power supply and said brake control circuit, said first and second sets of radiant energy receiving electrical contact sets being responsive to a respective one of said first and second solenoid coils; and
   logic means for controllably producing a fault signal in response to failure of at least one of said radiant energy emitting means, said radiant energy receiving means, and said first and second interruptible means, wherein said logic means includes a logic gate having a first input terminal connected to one of said first ad second electrical contacts sets, a second input terminal connected to the other of said first and second electrical contact sets, and an output terminal connected to said vehicle control circuit.

3. Apparatus for detecting failure of an obstacle sensing device associated with a vehicle, said vehicle having a power supply and a vehicle brake and brake control circuit, comprising:
   a plurality of radiant energy emitting devices each associated with a respective radiant energy receiving device;
   a vehicle control means for controllably producing first and second energization signals in response to a predetermined condition of said vehicle;
   first and second switch means for receiving respective ones or said frist and second energization signals, and responsively controllably supplying electrical power from said power supply to predetermined ones of said radiant energy emitting and receiving devices;
   first and second solenoid coils each serially connected to respective first and second sets of radiant energy receiving devices, said first and second sets of radiant energy receiving devices being mutually exclusive;
   first and second electrical contact sets serially connected between said power supply and said brake control circuit, each of said frist and second electrical contact sets being responsive to a respective one of said first and second solenoid coils; and
   logic means for controllably producing a fault signal in response to a failure of at least one of said radiant energy emitting devices, said radiant energy receiving devices, said first and second solenoid coils, and said first and second electrical contact sets, wherein said logic means includes a logic gate having a first input terminal connected to one of said first and second electrical contact sets, a second input terminal connected to the other of said first and second electrical contact sets, and an output terminal connected to said vehicle control means.

* * * * *

UNITED STATES PATENT AND TRADEMARK OFFICE
CERTIFICATE OF CORRECTION

PATENT NO. : 4,722,410

DATED : February 2, 1988

INVENTOR(S) : Grant C. Melocik and Joseph J. Harding

It is certified that error appears in the above-identified patent and that said Letters Patent is hereby corrected as shown below:

Column 1, lines 42 and 43, delete "to U.S. Pat. No. 3,560,922 issued Feb. 2, 1971".

Column 4, line 11, after "terminal" delete "a" and insert --38a--.

Column 6, line 31, "lerminal" should be --terminal--.

Column 7, line 8, "22" should be --122--.

Column 7, line 56, "enerty" should be --energy--.

Column 7, line 48, claim 1, "secnd" should be --second--.

Column 7, line 59, claim 2, "eahc" should be --each--.

Column 8, line 1, claim 2, "sasid" should be --said--.

Column 8, line 18, claim 2, following "receiving" insert --means being mutually exclusive and each of said first and second--.

Column 8, line 54, claim 3, "frist" should be --first--.

Signed and Sealed this

Fourth Day of October, 1988

*Attest:*

DONALD J. QUIGG

*Attesting Officer*   *Commissioner of Patents and Trademarks*